Feb. 12, 1929.
A. M. ENGLISH ET AL
1,701,667
FISH SCALING MACHINE
Filed April 2, 1927    3 Sheets-Sheet 3
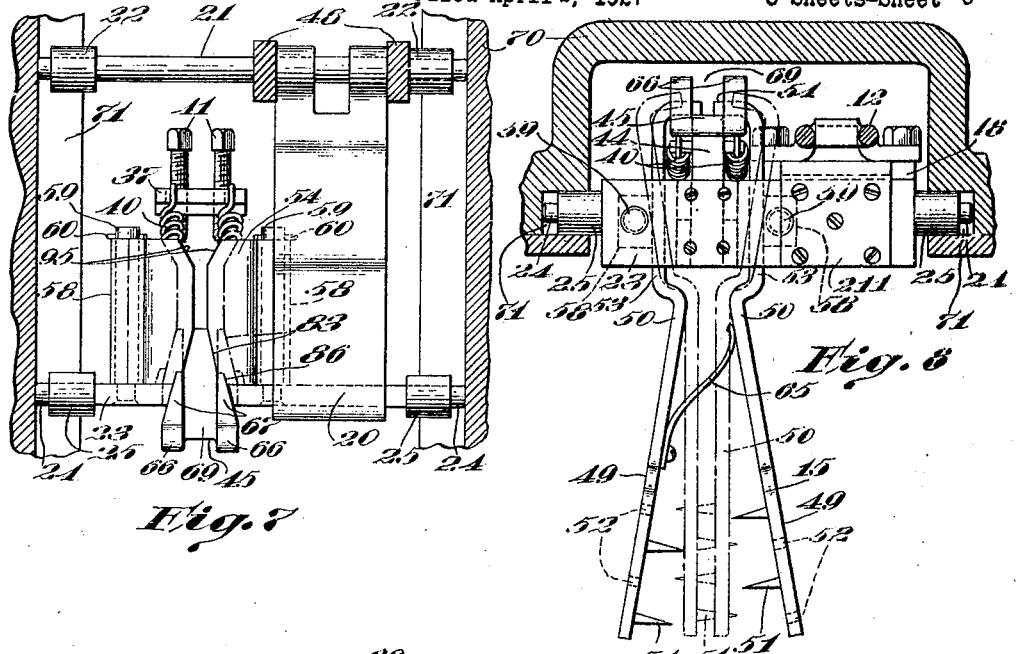
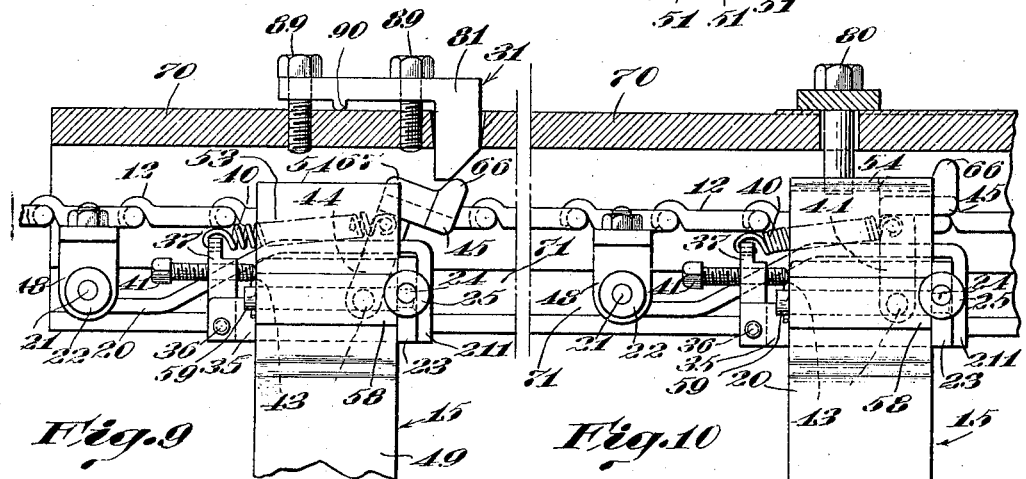
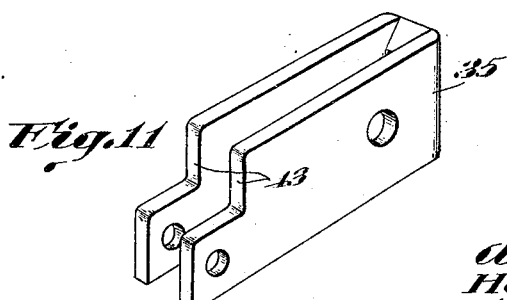

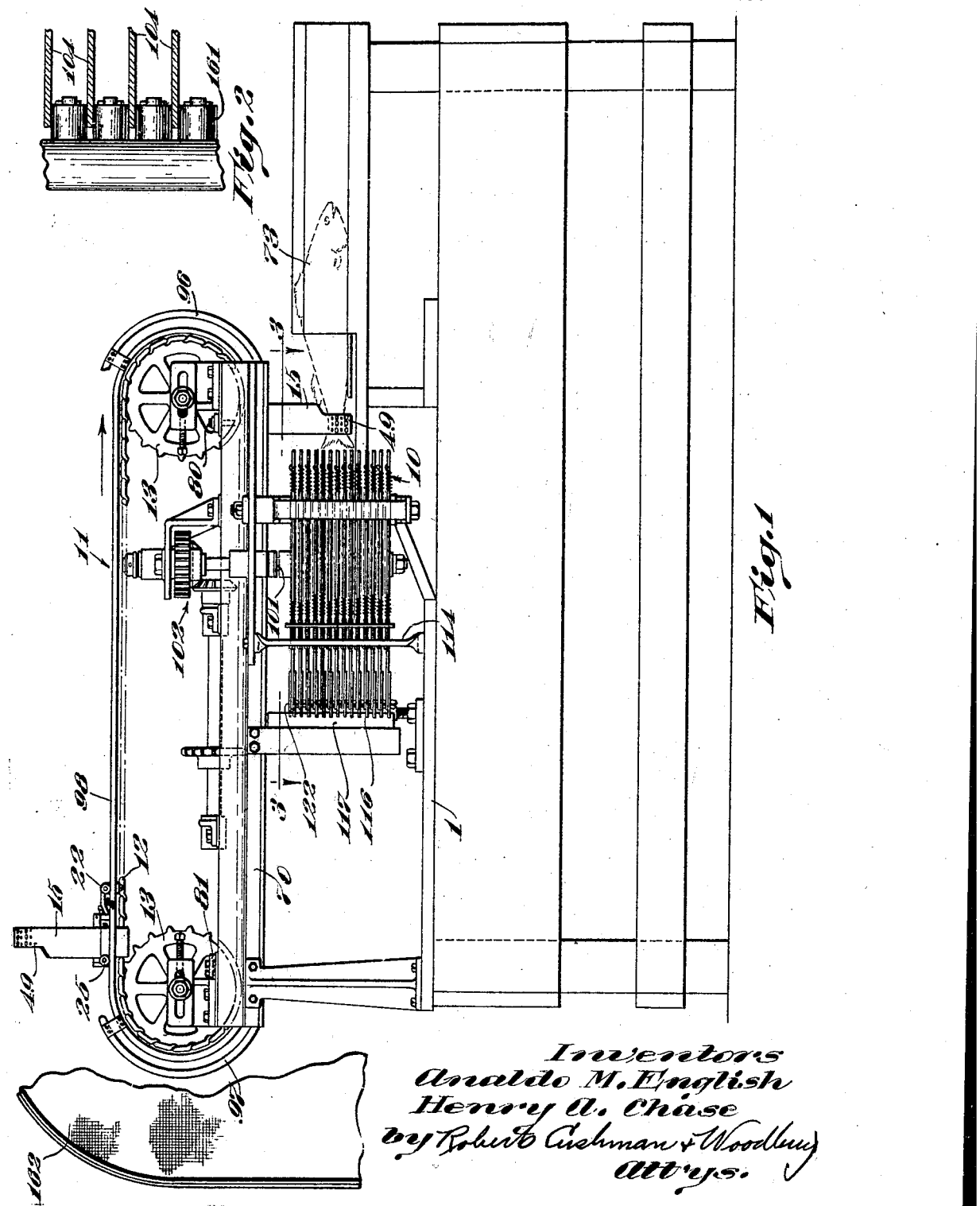
Feb. 12, 1929.
A. M. ENGLISH ET AL
1,701,667
FISH SCALING MACHINE
Filed April 2, 1927
3 Sheets-Sheet 1
Inventors
Analdo M. English
Henry A. Chase
by Roberts Cushman & Woodbury
att'ys.

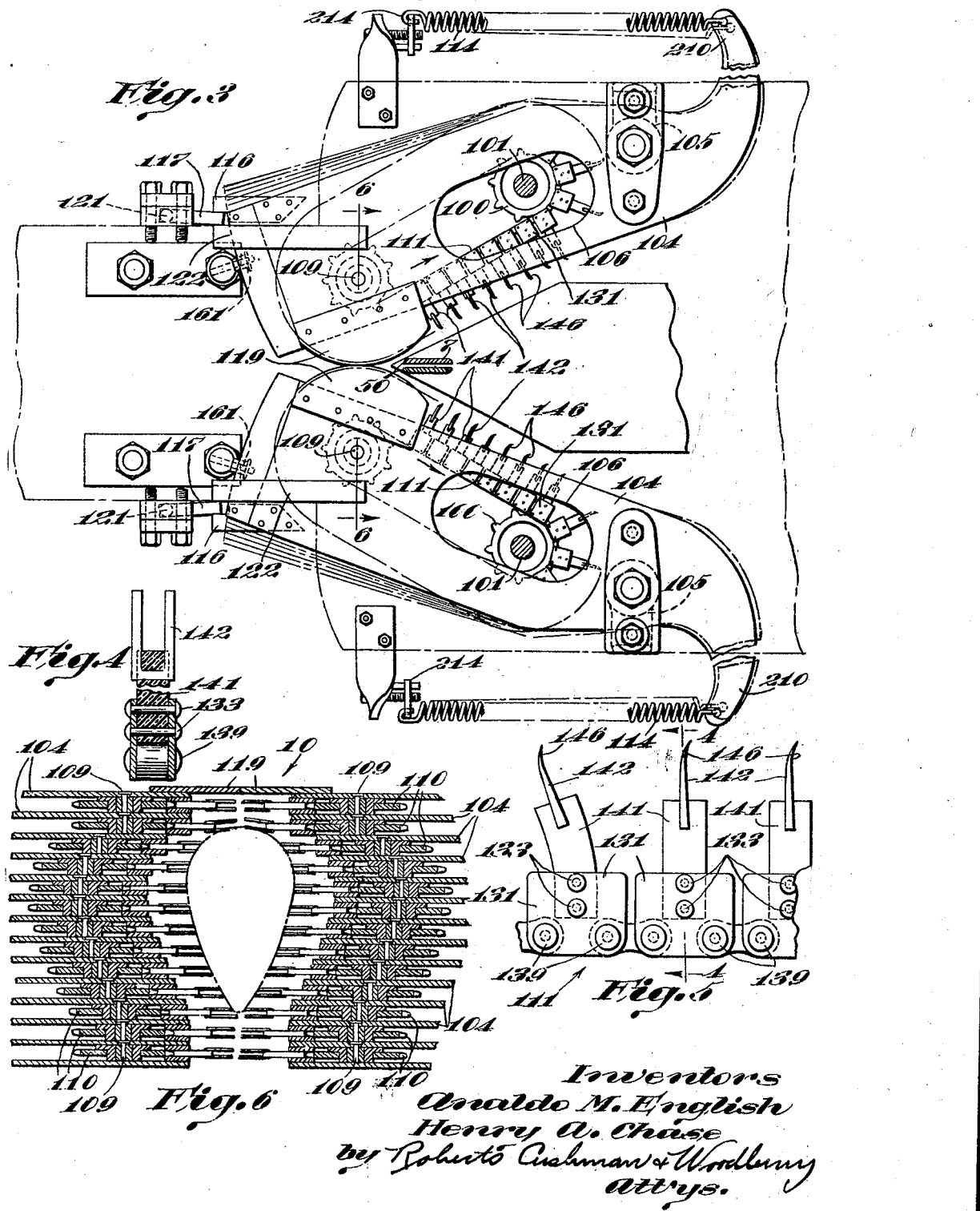

Patented Feb. 12, 1929.

1,701,667

UNITED STATES PATENT OFFICE.

ANALDO M. ENGLISH, OF BROOKLINE, AND HENRY A. CHASE, OF NEWTONVILLE, MASSACHUSETTS, ASSIGNORS TO BAY STATE FISHING COMPANY, OF BOSTON, MASSACHUSETTS, A CORPORATION OF MAINE.

FISH-SCALING MACHINE.

Application filed April 2, 1927. Serial No. 180,392.

This invention relates to a machine for removing the scales from fish, being adapted to receive fish which are fed thereto manually or mechanically and to convey the same between scale-removing elements and to deposit the scaled fish at a convenient point for further operations necessary to the dressing and the packing thereof.

One aspect of the invention relates to the provision of improved scale-removing elements which are adapted to conform to the shape of a fish which is drawn therebetween, and to remove scales from all parts of the fish, while at the same time avoiding tearing or cutting of the fish skin. For this purpose the present invention presents a series of yieldably mounted spill supporting elements which are adapted to hold a series of movable spills against the fish and to be forced outward by the bulging shape of the fish as it passes by the scale-removing elements.

The conveyor means which is adapted automatically to grasp the fish and convey them between scale-removing elements and to drop them at the predetermined point, comprises an improved form of automatically actuated, positively-locking clamp or grabber, which is adapted firmly to grasp the tail of a fish and to hold the same while the scales are being removed therefrom.

The above and further advantageous features and objects of the invention will be apparent to those skilled in the art upon the reading of the subjoined description and claims in conjunction with the accompanying drawings in which:

Fig. 1 is a side elevational view of the improved fish scaling machine;

Fig. 2 is a detailed view partly in section and partly in elevation;

Fig. 3 is a section on line 3—3 of Fig. 1;

Fig. 4 is a broken section on line 4—4 of Fig. 5;

Fig. 5 is an elevational view of a portion of the conveying chain;

Fig. 6 is a cross-sectional view of the scale-removing factors showing their ability to conform to the shape of the body of the fish passing therebetween;

Fig. 7 is a top view of the improved form of clamp and related parts;

Fig. 8 is an end elevation of the same;

Figs. 9 and 10 are side elevational views of the same with the parts shown in different cooperative relations; and Fig. 11 is a perspective detail of a part of the clamp.

Referring to the accompanying drawings, and more particularly to Fig. 1 thereof, an improved fish scaling machine which forms the subject of the present invention, comprises a supporting frame or table 1 that is provided with suitable brackets, standards or the like to support the various component elements of the fish scaling machine. The machine in general comprises scale-removing factors, designated by the numeral 10, which may conveniently comprise a plurality of yieldably mounted chains, and conveyor mechanism, designated in general by the numeral 11, which may conveniently comprise an endless chain carrying a plurality of clamps 15.

First referring to the conveyor mechanism, it is to be understood that the endless chain 12 passes over the sprockets 13 which may have horizontally disposed axes and one of which may be rotated by any suitable driving means in order to impart movement to the chain and the other sprocket. Pivotally mounted at suitable intervals upon the chain are a plurality of fish engaging clamps or grabbers 15; preferably these grabbers are arranged to grip the tail of a fish and firmly to hold the same while it is being conveyed past the scale-removing elements, whereupon the fish may be released from the clamp and the clamp may remain open until it returns to the position wherein another fish is engaged.

Figs. 7 to 11 illustrate in detail the improved form of clamp which is an advantageous feature of the present invention. This clamp preferably is provided with a framework comprising a strap metal member 20, one end of which receives the round bar or axle 21 carrying the rollers 22 at either end thereof, while member 21 pivots in brackets 48 which are secured to the chain 12. The other end 211 of bar 20 is bent downwardly (Fig. 9) and is secured against the flat face of a transverse bar 23, outer portions of which are turned to cylindrical form as designated by the numeral 24 to form pivots for rollers 25. Preferably rollers 22 and rollers 25 are spaced transversely at substantially the same distance from each other so that they may run upon suitable guideways. Secured against member 23 is the bight portion of the U-shape bracket 35 (Fig. 11). Extremities of the legs of this bracket receive pivot 36 upon which is mounted the swinging block 37, to which are secured springs 40 and through which are threaded adjusting screws 41, the latter bearing against appropriate surfaces 43 of the bracket 35. Adjoining the bight portion of the bracket is a transverse pivot 37 upon which is mounted the downwardly extending projection 44 of the swinging wedge 45. Springs 40 are secured to projection 44 and tend to draw the wedge toward the outer extremities of the legs of bracket 35.

Mounted at either side of the U-shaped bracket 35 are the complementary clamp or grabber members 50. These members are preferably formed with jaws 49 which have prongs 51 and cooperating openings or recesses 52, whereby the tail of a fish may be grasped and penetrated. Members 50 have offset portions 53 extending around the sides of bracket 35 and the upper extremities of which form inwardly extending projections or flanges 54 (Figs. 7 and 8). The ends of flanges 54 are beveled as designated by numerals 95 and 83, the bevels 83 having notches 86 to engage a portion of the swinging wedge as will be presently described. The intermediate portions of the offset sections 53 are provided with transverse flanges 58 that are bored to receive pintles 59, which project outwardly from the bar 23 (Fig. 7), and cotter pins 60 hold the blocks 58 upon the pintles 59. A suitably curved leaf spring 65 tends normally to press the jaws of the clamp apart and the flanges 54 toward each other, whereby the clamp is normally held in its open position.

The swinging wedge 45 comprises a bifurcated upper portion, each side of which is provided with an upstanding nub 66 which in turn is continued in a wedge-like extension 67 (Figs. 7 and 9). Between members 67 and 66 is a central depression 69.

In order to effect opening and closing of the clamps at the desired points and in order to provide guideways for the same, the machine is provided with a longitudinal frame member 70, which is disposed adjoining the lower run of chain 12. Member 70 has internal grooves 71 which form tracks or guideways for the rollers 22 and 25 of clamps 15. Adjoining feed trough 73 and projecting downwardly from an intermediate portion of member 70 is a pin or stud 80; this pin being adapted to effect the closing of the clamps upon the tail of a fish. Adjoining the opposite end of the frame 70 is an adjustable wedge 31 to open the clamps.

Assuming that the clamp is in its closed position as designated by the dotted line showing of Fig. 8, the springs 40 tend to draw the wedge member 45 into a position wherein the flanges 54 of the clamp members 50 are held apart by the location of the wedge projections 67 between beveled portions 83 of flanges 54, as shown by the dot and dash lines of Figs. 7 and 8 and the dotted lines of Fig. 10. Upon approaching the fixed beveled member 81, which normally lies in the path of projections 66 of wedge member 45, the wedge member is swung to the position shown in Figs. 7 and 9, and spring 65 forces the upper ends of the clamp members toward each other so that the wedge projection 67 of member 55 are caught by the notches 86 in flanges 54, and the springs 40 are prevented from swinging member 45 back to a position wherein the flanges 55 are spread apart and the clamp is closed until it again approaches pin 80. Member 81 preferably is provided with an extension secured by two screws 89 to the bed of frame 70, this extension being provided with a rocking lug 90 whereby the position of the member 81 may be adjusted.

The opened clamps upon approaching the feed trough 73 have their parts in the position shown in Fig. 7, whereupon the downwardly projecting pin 80 engages beveled edges 95 of flanges 54 and spreads the flanges far enough apart to move notches 86 out of engagement with wedge projections 67 and to permit springs 40 to cause member 45 to become wedged between beveled surfaces 83 of flanges 54 in order firmly to press the clamp jaws toward each other. Preferably suitable channel extensions 96 and 97 extend upwardly from opposite ends of the guideways 71 of the frame 70 and form continuations of the same in order to receive rollers 22 and 25. Adjoining the upper run of chain 12 a corresponding guideway 98 is adapted to hold the rollers in proper position.

Feed trough 73 may be of any convenient form in order to receive a fish and to guide it properly into a position wherein its tail will be grasped by a clamp 15.

The scale-removing factors are in the form of a plurality of superimposed chains, each of which carry a series of spills; groups of chains being arranged at opposite sides of the path of the fish and each chain being yieldably mounted so that its spills are pressed inwardly in engagement with various parts of the fish body. For this purpose sprockets 100 are keyed to vertically disposed shafts 101 upon either side of the frame 70, being driven by suitable gearing 102 from any appropriate source of power. Between each of the chains is located a swinging spacer plate 104, one end of which is pivotally mounted upon a vertically extending pintle 105, and which is provided with an opening 106 about the shaft 101 (Fig. 3). The other ends of plates 104 are supported upon spacing rollers 161 (Figs. 2 and 3), in order accurately to position the plates and prevent interference of the same with the sprockets and chains. Plates 104 receive the pivots 109 of sprockets 110 which cooperate with sprockets 100 to support each of the chains 111 independently. Plates 104 are provided with outstanding lugs 210 to which are secured tension springs 114 the opposite ends of which are secured to a fixed part of the machine, such as the bar 214 (Fig. 1). Thus plates 104 are normally drawn inwardly about the pivots 105 so that their ends which carry the sprockets 110 are swung inwardly toward the path of the fish. Suitable tongues 116 upon each of the plates 104 are adapted to engage a vertically disposed stop 117 to limit this inward movement (Fig. 3).

In order to avoid interference of the clamps with the scale-removing factors, I provide the upper pair of plates 104 with opposed cam members 119, which are disposed adjoining the inner edges of the plates and are adapted to engage members 50 in order to spread the upper plates 104 apart and consequently to move the upper chains 111 from the vicinity of the clamp. Stop 117 preferably is mounted on the vertically disposed pintles 121 and is adapted to be engaged by the projections 122 upon the upper pair of plates 104 so that outward movement of these plates due to engagement of cams 119 with clamps 15 results in the outward swinging of stop 117, which in turn engages the lugs 116 of the remaining spacer plates 104 so that the whole series of spacer plates are swung outwardly by the action of cams 119.

Chains 111 are preferably provided with alternate links which carry scale-removing spills 130. These links are shown more particularly in Figs. 4 and 5 and comprise spaced parallel plates 131 which are secured together by the rivets 133 as well as by the pins 139 of the chain in order to form alternate links of the same. Rivets 133 pass through a yieldable tongue 141 which projects outwardly from the link and in which is mounted the double-ended spill 142. This spill is preferably provided with pointed end portions which are slightly bent, as designated by numeral 146, so that in practice the pointed ends of the spills are adapted more easily to engage under the fish scales.

The operation of this machine is as follows:

Fish are fed to the conveyor mechanism from the feed trough 73, being located with their tails in the position indicated in Fig. 1. The chain 11 moves in the direction of the arrow of Fig. 1 and, when the clamp 15 is brought into proper position, it is opened due to the engagement of pin 80 with the beveled edges 95 of the clamp 15 so that the wedge 45 is adapted positively to hold the upper ends of the clamp members 50 apart and the jaws thereof together in gripping engagement with the tail of a fish. The fish is thereupon drawn between the opposite scale-removing factors, each of which comprises a plurality of superimposed chains 111. The clamp engages the cams 119 which swing member 117 about pintles 121 so that the plates 104 are forced outwardly by engagement of member 117 with the lugs 116. As soon as the clamp has passed the cam members 119, the springs 114 automatically force the plates and chains inwardly toward the fish. Since the sprockets 111 are independently yieldable due to the mounting of sprockets 110 upon plates 104, engagement of spills 146 with the body of the fish causes the corresponding chain portion to be forced outwardly a proper amount to conform to the shape of the fish body which is passing between the adjoining parts of the opposed groups of chains, as diagrammatically indicated in Fig. 6. The chains 111 moving in the direction of the arrows of Fig. 3 are adapted yieldably to force the ends 146 of spills 142 under the scales of the fish. The yieldable tongues 141 which support the spills 146 permit the same more readily to conform to the particular contour of the fish body.

The clamp 15 during this portion of its path is held in proper position due to the engagement of rollers 22 and 25 within guideways 71. As clamp 15 continues toward the opposite end of the frame 70, the projections 66 of member 45 engage the fixed wedge 81, whereby swinging wedge 45 is pushed out of engagement with the beveled portions 83 of the clamp flanges 54 and its wedge projections 67 snap into engagement with the notches 86 as indicated in Fig. 7. Thus the clamp is held open and travels upwardly to a position wherein the rollers 22 move from engagement with the guide extensions 97 to engagement with the guideway 98, the clamp being in the position shown at the upper part of Fig. 1, and continuing its movement until rollers 22 are engaged by guideway extensions 96 due to the tendency of the clamp to swing about axle 21, whereupon the rollers are again engaged within the guideways 71 and the clamp is again closed by the engagement of flanges 54 of clamp members 50 with the pin 80. Obviously fish may pass downwardly to a suitable chute located below the wedge member 81, so that they may drop to a lower floor by gravity or may be picked up by any suitable conveyor to undergo suitable operations necessary to dressing and packing thereof. The scales removed from the fish drop to the floor in the vicinity of the scale-removing elements and may be swept into an opening in the same or removed in any desired manner. A meshed wire guard 162 may be located about the machine to catch flying scales and to protect workmen if desired.

It is thus evident that the present machine is adapted automatically to grasp a fish, to carry the same between suitable scale-removing elements; these scale-removing elements being arranged to avoid interference with conveying mechanism and yet conforming to the shape and size of the body of the particular fish from which the scales are being removed. Thereupon the machine is adapted to release the fish at a convenient point for further treatment.

We claim:

1. In a machine of the class described a plurality of juxtaposed, substantially parallel endless chains, each of said chains being wrapped around two sprockets, one of which sprockets is yieldably mounted to permit movement of the adjoining portion of the chain in relation to the remainder thereof, scale-removing spills carried by said chains, and means for drawing fish past the portions of the chains which are wrapped around the yieldably mounted sprockets, whereby the chains may be moved various amounts to conform to the shape of the fish from which scales are being removed.

2. In a machine of the class described two opposed sets of chains each consisting of a plurality of substantially parallel endless chains, each of said chains being wrapped around two sprockets, one of said sprockets being yieldably mounted to permit movement of the adjoining portion of the chain in relation to the remainder thereof, scale-removing spills carried by said chains, and means for drawing fish between portions of the opposed sets of chains which are wrapped around the yieldably mounted sprockets, whereby adjoining portions of the chains may be moved various amounts to conform to the shape of the fish from which scales are being removed.

3. In a machine of the class described a plurality of substantially parallel endless chains, each of said chains being wrapped around two sprockets, one of said sprockets being yieldably mounted to permit movement of the adjoining portion of the chain in relation to the remainder thereof, means for yieldably mounting each of said sprockets comprising a plurality of plates upon each of which one of the yieldably mounted sprockets is pivoted, a pivot remote from the sprocket about which the plate may swing, and a spring and stop yieldably to maintain each plate in a predetermined position, scale-removing spills carried by said chains, and means for drawing fish past the portions of the chains which are wrapped around the yieldably mounted sprockets, whereby chains may be moved various amounts to conform to the contour of the fish from which scales are being removed.

4. In a machine of the class described, an endless moving chain, alternate links of said chain being provided with outstanding yieldable elements, and projecting, double-ended scale-removing spills having their inner ends held in said yieldable elements, whereby the spills may conform to the shape of a fish body.

5. In a machine of the class described, an endless moving chain, certain links of said chain comprising parallel plates connected by transversely disposed parts of the chain and being provided with outstanding yieldable elements, and outstanding scale-removing spills having their inner ends held in said yieldable elements, whereby the spills may conform to the shape of a fish body.

6. In a machine of the class described, an endless moving chain, certain links of said chain comprising parallel plates connected by transversely disposed parts of the chain and being provided with outstanding rubber elements, and outstanding scale-removing spills having their inner ends held in said yieldable elements, and their outer ends pointed and slightly bent, whereby the spills may conform to the shape of a fish body and may readily engage the under sides of the fish scales.

7. In a machine of the class described, a series of parallel, flexible, endless scale-removing elements, said scale-removing elements being supported by rotatable members at their opposite ends, said members at one end being yieldably mounted, conveyor means arranged to carry fish past the yieldably mounted end of the scale-removing elements, said conveyor means including clamps to grip the fish, and means for moving the scale-removing elements out of the path of the clamps, but to permit them to engage the fish held by the clamps.

8. In a machine of the class described, a series of parallel, flexible, endless scale-removing elements, said scale-removing elements being supported by rotatable members at their opposite ends, said members at one end being yieldably mounted, conveyor means arranged to carry fish past the yieldably mounted end of the scale-removing elements, said conveyor means including clamps to grip the fish, said scale-removing elements being yieldably pressed toward the path of the fish as carried by the conveyor means and having their movement toward said path limited.

9. In a machine of the class described, a plurality of substantially parallel endless chains, each of said chains being wrapped around two sprockets, one of which sprockets is yieldably mounted to permit movement of the adjoining portion of the chain in relation to the remainder thereof, means for yieldably mounting said sprockets comprising a plurality of plates upon each of which one of the yieldably mounted sprockets is pivoted, a pivot remote from the sprocket about which the plate may swing, and a spring and stop yieldably to maintain each plate in a predetermined position, scale-removing spills carried by said chains, and means for drawing fish by the portions of the chains wrapped around the yieldably mounted sprockets, said means including clamps for engaging the fish, a cam element upon one of the plates engageable with the clamps whereby that plate may be swung outwardly away from the clamps, said plate being operatively connected to the remaining plates to cause them similarly to move, whereby adjoining portions of the chains may be moved various amounts to conform to the contour of the fish from which scales are being removed, and whereby interference of the spills and the clamps is avoided.

10. In a machine of the class described, a plurality of substantially parallel endless chains, each of said chains being wrapped around two sprockets, one of which sprockets is yieldably mounted to permit movement of the adjoining portion of the chain in relation to the remainder thereof, means for yieldably mounting said sprockets comprising a plurality of plates upon each of which one of the yieldably mounted sprockets is pivoted, a pivot remote from the sprocket about which the plate may swing, and a spring and stop yieldably to maintain each plate in a predetermined position, scale-removing spills carried by said chains, and means for drawing fish by the portions of the chains wrapped around the yieldably mounted sprockets, said means including clamps for engaging the fish, a cam element upon one of the plates engageable with the clamps whereby that plate may be swung outwardly away from the clamps, said plate being operatively connected to the remaining plates through said stop to cause them similarly to move, whereby adjoining portions of the chains may be moved various amounts to conform to the contour of the fish from which scales are being removed, and whereby interference of the spills and the clamps is avoided.

11. In a machine of the class described, scale-removing factors and conveyor means for moving fish past said factors, said means comprising an endless flexible element movable about rotatable supports at its ends, and clamps carried by said element, a wedge upon each clamp designed to positively hold the jaws of the clamp together, and means disposed in the path of the clamp to engage the wedge to permit opening of the jaws to release the fish.

12. In a machine of the class described, scale-removing factors and conveyor means for moving fish past said factors, said means comprising an endless flexible element movable about rotatable supports at its ends, and clamps carried by said element, a wedge upon each clamp, springs tending to draw said wedge between portions of the clamp in order positively to hold the jaws of the clamp together, and means disposed in the path of the clamp to engage the wedge and to act against the springs to permit opening of the jaws to release the fish.

13. In a machine of the class described, scale-removing factors and conveyor means for moving fish past said factors, said means comprising an endless flexible element movable about rotatable supports at its ends, and clamps carried by said element, each clamp comprising pivotally mounted jaws to engage a fish, and extensions of the jaws adapted to be engaged by a wedge upon the clamp, which is designed positively to hold the jaws of the clamp together, means disposed in the path of the clamp to force the jaw extensions apart to permit engagement of the wedge therebetween whereby the jaws are closed to engage a fish and means disposed in the path of the clamp to engage the wedge to permit opening of the jaws to release the fish.

14. In a machine of the class described, scale-removing factors and conveyor means for moving fish past said factors, said means comprising an endless flexible element movable about rotatable supports at its ends, and clamps carried by said element, each clamp comprising pivotally mounted jaws to engage a fish, and extensions of the jaws adapted to be engaged by a wedge upon the clamp designed to positively hold the jaws of the clamp together, and means for removing the wedge from this position when the clamp arrives at a given part of their path.

15. In a machine of the class described, scale-removing factors and conveyor means for moving fish past said factors, said means comprising an endless flexible element movable about rotatable supports at its ends, and clamps carried by said element, said clamps being transversely pivoted to the flexible element and being provided with rollers having parallel axes, guide means substantially paralleling a portion of the flexible element and adapted to engage the rollers to maintain the pivoted clamps in proper position during their movement with the flexible element.

16. In a machine of the class described, scale-removing factors and conveyor means for moving fish past said factors, said means comprising an endless flexible element movable about rotatable supports at its ends, and clamps carried by said element, a portion of said clamps being pivotally connected to said chain, a roller carried by the pivotally mounted clamp portion and guide means engageable with said roller to hold the pivoted clamp portion in proper position during a portion of its movement with the flexible element.

Signed by us at Boston, Massachusetts, this 29th day of March, 1927.

ANALDO M. ENGLISH.
HENRY A. CHASE.